US009806750B2

(12) United States Patent
Qi et al.

(10) Patent No.: US 9,806,750 B2
(45) Date of Patent: Oct. 31, 2017

(54) BLUETOOTH ASSISTED REMOTE DISCOVERY AND WAKEUP

(71) Applicant: Intel Corporation, Santa Clara, CA (US)

(72) Inventors: Emily H. Qi, Camas, WA (US); Carlos Cordeiro, Portland, OR (US); Robert D. Hughes, Tualatin, OR (US)

(73) Assignee: INTEL CORPORATION, Santa Clara, CA (US)

( * ) Notice: Subject to any disclaimer, the term of this patent is extended or adjusted under 35 U.S.C. 154(b) by 117 days.

(21) Appl. No.: 14/483,717

(22) Filed: Sep. 11, 2014

(65) Prior Publication Data

US 2015/0319596 A1  Nov. 5, 2015

Related U.S. Application Data

(60) Provisional application No. 61/987,998, filed on May 2, 2014.

(51) Int. Cl.
H04B 1/3827 (2015.01)
H04W 52/02 (2009.01)
H04W 4/00 (2009.01)
H04W 8/00 (2009.01)
H04W 88/06 (2009.01)

(52) U.S. Cl.
CPC .......... *H04B 1/3827* (2013.01); *H04W 4/008* (2013.01); *H04W 8/005* (2013.01); *H04W 52/0209* (2013.01); *H04W 52/0293* (2013.01); *H04W 88/06* (2013.01); *Y02B 60/50* (2013.01)

(58) Field of Classification Search
CPC .................................................. H04B 1/3827
See application file for complete search history.

(56) References Cited

U.S. PATENT DOCUMENTS

| 9,362,973 B2* | 6/2016 | Rexberg | H04B 7/0413 |
| 2011/0110375 A1* | 5/2011 | Boucadair | H04L 29/12358 370/393 |
| 2014/0045483 A1* | 2/2014 | Whidden | H04M 1/24 455/420 |
| 2014/0206382 A1* | 7/2014 | Shabtay | G01S 5/0289 455/456.1 |

* cited by examiner

Primary Examiner — Hsin-Chun Liao

(57) ABSTRACT

Disclosed herein are techniques to enable remote discovery of connectivity capabilities and remote connection of devices in a power efficient manner. In particular, discovery and connection requests for connectivity capabilities utilizing a first radio may be communicated using a second radio, the second radio utilizing a lower amount of power relative to the first radio. For example, connectivity capabilities such as Wi-Fi, Wi-Fi Direct, WiGig, Zigbee can be discovered and connection request communicated using a Bluetooth radio.

14 Claims, 7 Drawing Sheets

Connectivity Capability Bitmap 310

| Bit 1 311-1 | Bit 2 311-2 | Bit 3 311-3 | ---- | Bit n 311-n |
|---|---|---|---|---|

*FIG. 2*

Remote Wakeup Bitmap 320

| Bit 1 321-1 | Bit 2 321-2 | Bit 3 321-3 | ---- | Bit n 321-n |
|---|---|---|---|---|

*FIG. 3*

BLUETOOTH ASSISTED REMOTE DISCOVERY AND WAKEUP

RELATED CASES

This application claims the benefit of U.S. Provisional Application Ser. No. 61/987,998 filed May 2, 2014, entitled "BLUETOOTH ASSISTED REMOTE DISCOVERY AND WAKEUP," which application is incorporated herein by reference in its entirety.

TECHNICAL FIELD

Embodiments described herein generally relate to wireless communications and in particular to connectivity capability discovery.

BACKGROUND

Many modern devices include networking capabilities. In particular, many devices include various communication and networking abilities. Modern applications are beginning to take advantage of this and provide for interconnectivity of such devices. For example, social networking applications, Internet of Things, wireless docking, etc. may provide for the interconnectivity of various devices. A variety of standards are used and/or proposed to facilitate such device connectivity. For example, Wi-Fi Direct, peer-to-peer, neighbor awareness networking, proximity discovery, or the like.

In order to provide mechanisms for device and service discovery, connection management, and session management in conjunction with such connection techniques, available services must be communicated. Typically, such services are discovered using Wi-Fi. As will be appreciated, this can consume a significant amount of power.

BRIEF DESCRIPTION OF THE DRAWINGS

FIG. 2 illustrates one embodiment of connectivity capability information.

FIG. 3 illustrates one embodiment of remote wakeup information.

DETAILED DESCRIPTION

The present disclosure is generally directed to providing low power always-on device discovery and remote wakeup. Said differently, the present disclosure provides various examples of reducing power consumption for devices during discovery of adjacently available wireless services. In particular, according to some examples, information including available services may be transmitted using a radio (e.g., Bluetooth (BT), or the like) that utilizes a lower amount of power relative to the radio used to operate the advertised service. Furthermore, a request to establish connection over one of the advertised services may be received and the radio used to communicate via the requested service may be "woken-up." Accordingly, devices in a network or devices adjacent to each other may advertise wireless services and initiate connections over one or more of the advertised services in a power efficient manner.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
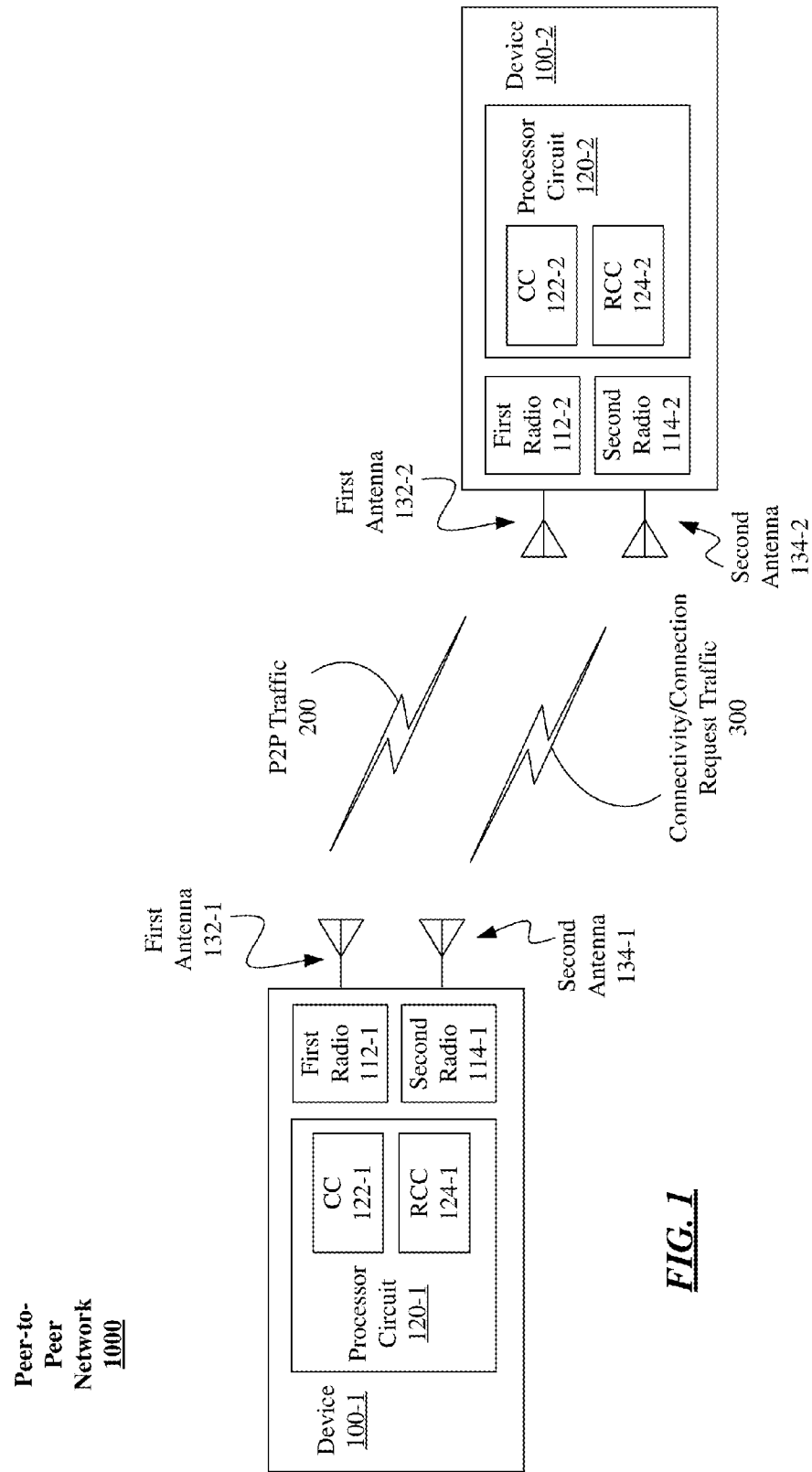
FIG. 1 illustrates one embodiment of a peer-to-peer network.

FIG. 1 illustrates a peer-to-peer (P2P) network 1000. The network 1000 includes devices 100-$a$, where "a" is a positive integer. In particular, devices 100-1 and 100-2 are shown. However, it is to be appreciated, that any number of devices 100-$a$ may be implemented, and the number of devices depicted is merely shown at a quantity to facilitate understanding.

Each of the devices 100-$a$ includes a first radio 112-$a$ and a second radio 114-$a$. In general, one of the radios (e.g., the second radio 114-$a$) may utilize a lower amount of power relative to the other radio (e.g., the first radio 112-$a$). In general, with some examples the second radio 114-$a$ may be implemented to discover other devices' connectivity capabilities and to wake up the first radio 112-$a$ for purposes of communicating over the P2P network 1000.

For example, in some embodiments, the first radio 112-$a$ may be a Wi-Fi radio, while the second radio 114-$a$ may be a Bluetooth (BT) radio. As another example, the first radio 112-$a$ may be a WiGig radio, a ZigBee radio, or in general, any radio used for network communication. In a particular example, current draw in idle mode for the first radio 112-$a$ may be greater than 30 mA while current draw in idle mode for the second radio 114-$a$ may be less than 30 mA. In some examples, the first radio may utilize approximately 36 mA of current while the second radio may utilize approximately 21.6 mA of current. It is to be appreciated, that the current amounts provided herein are given for example only and are not intended to be limiting.

Furthermore, each of the devices 100-$a$ includes a first antenna (or antenna array) 132-$a$ and a second antenna (or antenna array) 134-$a$. The first and second antennas 132-$a$ and 134-$a$ are operably connected to the first and second radios 112-$a$ and 114-$a$, respectively. Additionally, it is to be appreciated, that although not depicted, one of the devices 100-$a$ may be provided with a single antenna (or antenna array) operably connected to both the first and second radios 112-$a$ and 114-$a$.

Additionally, each of the devices 100-$a$ includes a processor circuit 120-$a$ operably coupled to the first and second radios 112-$a$ and 114-$a$. In some examples, the processor circuit 120-$a$ may be an application processor of the device 100-$a$. In some examples, the processor circuit 120-$a$ may be a baseband processor of the device 100-$a$. Each of the devices 100-$a$ may also include a connectivity component 122-$a$ (referred to as "CC 122-$a$" in the figures) and a remote connection component 124-$a$ (referred to as "RCC 124-$a$" in the figures). The connectivity component 122-*a* and the remote connection component 124-*a* may comprise programming, functions, logic, parameters, and/or other information operative to implement particular capabilities for the devices 100-*a*. In some examples, the components 122-*a* and 124-*a* may be executable by the processing circuit 120-*a*.

During operation, the devices 100-*a* may transmit signals including indications of connectivity capabilities and requests for connection (e.g., shown as Connectivity/Connection Traffic 300) using the second radio 114-*a*. Based on these signals, the devices 100-*a* may form the P2P network 1000 and/or communicate in the P2P network 1000 using the first radios 112-*a*. In particular, the devices 100-*a* may advertise their connectivity capabilities and/or discover other devices connectivity capabilities using the second radio 114-*a*, which may utilize a lower amount of power than the first radio 112-*a*. Upon discovering a device with a desired connectivity capability, the P2P network 1000 may be established.

Figure 5:
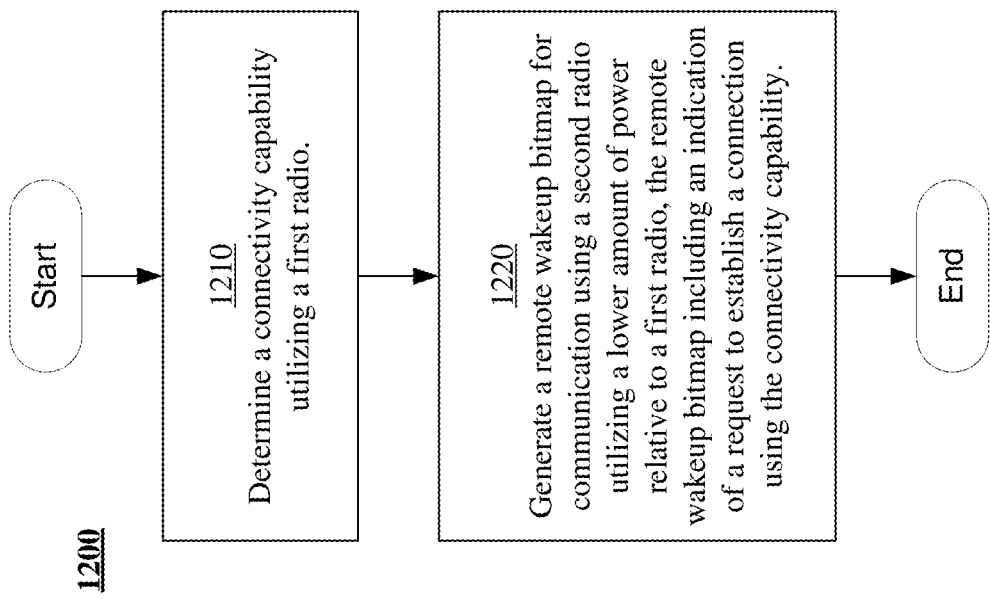
FIGS. 4-5 illustrate logic flows for embodiments of connectivity capability discovery and remote wakeup.

In general, each of the devices 100-*a* may operate to both advertise their own connectivity capabilities (e.g., refer to FIG. 4) and identify connectivity capabilities of adjacent devices (e.g., refer to FIG. 5). However, for purposes of explanation and clarity, the device 100-1 will be referrer to as the "advertiser" and the device 100-2 will be referred to as the "requestor". More specifically, in describing the examples provided herein, the device 100-1 will be described in the context of advertising its connectivity capabilities and the device 100-2 will be described in the context of requesting connection with the device 100-1 utilizing a connectivity capability. It is to be appreciated that this is not intended to be limiting and is merely done for convenience in referring to the figures.

The connectivity component 122-1 may determine a connectivity capability (which may include multiple different connectivity capabilities) utilizing the first radio 112-1 and generate connectivity capability information (e.g., refer to FIG. 2) to be communicated by the second radio 114-1, the connectivity capability information including an indication of the connectivity capability. The connectivity component 122-1 may send a control directive to power on the second radio 114-1 in order to communicate the connectivity capability information. Furthermore, the connectivity component 122-1 may repeatedly (e.g., periodically, at fixed intervals, or the like) cause the connectivity capability information to be communicated using the second radio 114-1.

In some examples, the connectivity component 122-1 may determine an availability of the first radio 112-1 and generate the connectivity capability information to include an indication of the availability. For example, the connectivity component 122-1 may determine the availability of the radio 112-1 based on existing network connections utilizing the radio 112-1. More specifically, availability of the radio 112-1, and thus availability of the connectivity capabilities utilizing the first radio 112-1 may be limited and/or restricted by existing network connections that utilize the first radio 112-1. In a specific example, the first radio 112-1 may be used to connect to a neighbor awareness network (NAN). As such, the availability of the connectivity capabilities advertised in the connectivity capability information may be based on the NAN timing information. Furthermore, the connectivity component 122-1 may generate the connectivity capability information to include an indication of a time stamp and/or other information (e.g., NAN cluster ID, discovery window timing, or the like) corresponding to the identified availability.

The remote connection component 124-1 may receive remote wakeup information (e.g., refer to FIG. 3), the remote wakeup information including an indication of a request to establish a connection using the connectivity capability from an adjacent device (e.g., the device 100-2). Furthermore, the remote connection component 124-1 may send a control directive to power on the first radio 112-1 in order to establish communication using the connectivity capability.

The connectivity component 122-2 may determine a connectivity capability based on receiving connectivity capability information from an adjacent device (e.g., the device 100-1). The remote connection component 124-2 may generate the remote wakeup information for communication using the second radio 114-2, the remote wakeup information including an indication of a request to establish a connection using the identified connectivity capability (e.g., a connectivity capability advertised by the adjacent device). With further examples, the connectivity component 122-2 may also generate the connectivity capability information to comprise the remote wakeup information. As such, signals including an indication of the connectivity capabilities of the device 100-2 as well as a request to establish connection using a connectivity capability may be communicated.

In general, the connectivity capability may be any of a variety of connectivity capabilities. For example, with some implementations, the connectivity capability may comprise one or more of Wi-Fi P2P, Wi-Fi Direct, TDLS, IBSS, Mesh, Ranging/Location, WiGig, and Wi-Fi NAN. Accordingly, the P2P network 1000 may be provided in accordance with any of a variety of different P2P techniques or standards. For example, the P2P network may be provided in accordance with WLAN infrastructure, Wi-Fi Direct, Wi-Fi NAN, WiGig, Mesh, etc. Furthermore, the main radio 112-2 may include a Wi-Fi radio, a WiGig radio, a ZigBee radio, or the like.

FIG. 2 illustrates example connectivity capability information 310, which may be communicated by one of the devices 100-*a* using the second radio 114-*a* to advertise connectivity capabilities of the device. In some examples, the connectivity capability information 310 may be a BT frame transmitted over BT frequencies. In some examples, the connectivity capability information may be information and/or indications included within a BT Advertising or Scan Response packet. In some examples, the following information, corresponding to the connectivity capability information, can be added to a BT ADV IND, advertise frame, request frame, and/or a response frame. Accordingly, the connectivity capability information 310 may be communicated to "advertise" supported connectivity capabilities. In some examples, the connectivity capability information 310 may be a bitmap.

As depicted, the connectivity capability information 310 includes a number of fields 311-*a* (or "bits") that can be set to indicate the various connectivity services supported by the device. It is to be appreciated, that in some examples, the fields of the discovery beacon may be contiguously located in the frame. Furthermore, it is to be appreciated, that the example implementation shown in FIG. 2 along with the table described below are given for convenience and clarity of presentation and are not intended to be limiting. For example, the fields 311-*a* may include more than one bit, depending upon the implementation.

| Bit(s) | Connectivity Capability | Description |
|---|---|---|
| 0 | WLAN Infrastructure | When set to 1, the device is currently connected to a WLAN Infrastructure AP. Set to 0 otherwise. |
| 1 | Wi-Fi P2P | When set to 1, the device supports Wi-Fi P2P. Set to 0 otherwise. |
| 2 | Wi-Fi Direct Services | When set to 1, the device supports Wi-Fi Direct Services. Set to 0 otherwise. |
| 3 | TDLS | When set to 1, the device supports TDLS. Set to 0 otherwise. |
| 4 | IBSS | When set to 1, the device supports IBSS. Set to 0 otherwise. |
| 5 | Mesh | When set to 1, the device supports Mesh. Set to 0 otherwise. |
| 6 | Ranging/Location | When set to 1, the device supports Ranging/Location. Set to 0 otherwise. |
| 7 | WiGig | When set to 1, the device supports WiGig. Set to 0 otherwise. |
| 8 | Wi-Fi NAN | When set to 1, the device supports Wi-Fi NAN. Set to 0 otherwise. |
| 9-15 | Reserved | Reserved. |

FIG. 3 illustrates example remote wakeup information 320, which may be communicated by one of the devices 100-a using the second radio 114-a to request connection using a connectivity capability. In some examples, the remote wakeup information 320 may be a BT frame transmitted over BT frequencies. In particular, the bitmap 320 may be transmitted to request another device (e.g., the device 100-1) to power on a first radio (e.g., the first radio 112-1) for purposes of P2P communication. For example, if two devices (e.g., 100-1 and 100-2) find matched connectivity capability (e.g., via the connectivity capability information 310), these devices can then negotiate to start using a common connectivity capability by communicating the remote wakeup information 320. In some examples, the remote wakeup information may be information and/or indications included within a BT Advertising or Scan Response packet. In some examples, the following information, corresponding to the remote wakeup information, can be added to a BT ADV_IND, advertise frame, request frame, and/or a response frame. In some examples, the remote wakeup information 320 may be a bitmap.

As depicted, the remote wakeup radio bitmap 320 includes a number of fields 321-a (or "bits") that can be set to wakeup various radios supported by the target device. It is to be appreciated, that in some examples, the fields of the discovery beacon may be contiguously located in the frame. Furthermore, it is to be appreciated, that the example implementation shown in FIG. 3 along with the table described below are given for convenience and clarity of presentation and are not intended to be limiting. For example, the fields 321-a may include more than one bit, depending upon the implementation.

| Bit(s) | Remote Radio to Wakeup | Description |
|---|---|---|
| 0 | Wi-Fi | When set to 1, remote wakeup of the Wi-Fi radio is requested/accepted. Set to 0 otherwise. |
| 1 | WiGig | When set to 1, remote wakeup of the WiGig radio is requested/accepted. Set to 0 otherwise. |
| 2 | Zigbee | When set to 1, remote wakeup of the Zigbee radio is requested/accepted. Set to 0 otherwise. |
| 3-15 | Reserved | Reserved. |

Figure 4:
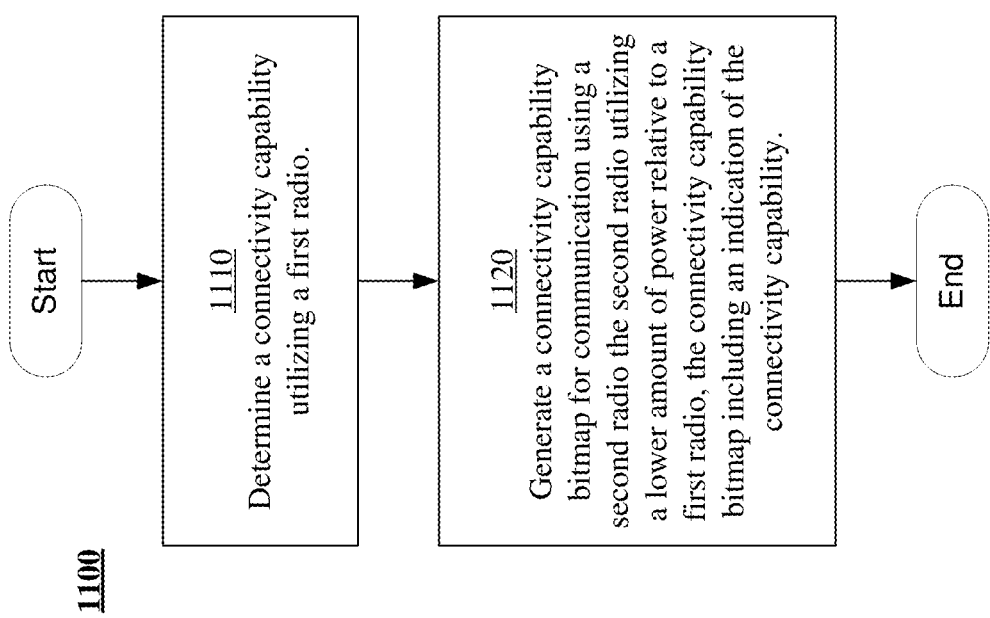

FIGS. 4-5 illustrate examples of logic flows representative of at least some operations executed by one or more logic, features, or devices described herein. In general, the logic flows may be representative of some or all of the operations executed by logic and/or features of the devices 100-a of the system 1000. In particular, FIG. 4 may be representative of operations performed by the device 100-1 in advertising its connectivity capabilities while FIG. 5 may be representative of operations performed by the device 100-2 in requesting the P2P connection. It is to be appreciated, that although the example logic flows are described with reference to the system 1000 of FIGS. 1-3, this is not intended to be limiting and is merely done for clarity of presentation.

Turning more specifically to FIG. 4, a logic flow 1100 is depicted. The logic flow 1100 may begin at block 1110. At block 1110, "determine a connectivity capability utilizing a first radio" the device 100-1 may determine a connectivity capability (which may include multiple connectivity capabilities) utilizing the first radio 112-1. In particular, the connectivity component 122-1 may determine the connectivity capabilities utilizing the first radio 112-2 that are supported by the device 100-1.

Continuing to block 1120, "generate connectivity capability information for communication using a second radio the second radio utilizing a lower amount of power relative to a first radio, the connectivity capability information including an indication of the connectivity capability" the device 100-1 may generate the connectivity capability information 310. In particular, the connectivity component 122-1 may generate the connectivity capability information 310 to include indications of the identified connectivity capability of the device 100-1.

Turning more specifically to FIG. 5, a logic flow 1200 is depicted. The logic flow 1200 may begin at block 1210. At block 1210, "determine a connectivity capability utilizing a first radio" the device 100-2 may determine a connectivity capability utilizing the first radio 112-2. In particular, the connectivity component 122-2 may determine the connectivity capabilities utilizing the first radio 112-2 that are supported by the device 100-1. Furthermore, the connectivity component 122-2 may determine the connectivity capability based on receiving the connectivity capability information 310 from the device 100-1. In particular, the connectivity capability information 122-2 may determine the connectivity capability supported by the device 100-1 and also supported by the device 100-2.

Continuing to block 1220, "generate remote wakeup information for communication using a second radio utilizing a lower amount of power relative to a first radio, the remote wakeup information including an indication of a request to establish a connection using the connectivity capability" the device 100-2 generates the remote wakeup information 320 for communication using the second radio 114-2. In particular, the remote connectivity component 124-2 generates the remote wakeup information 320 for communication to the device 100-1 using the second radio 114-2.

Figure 6:
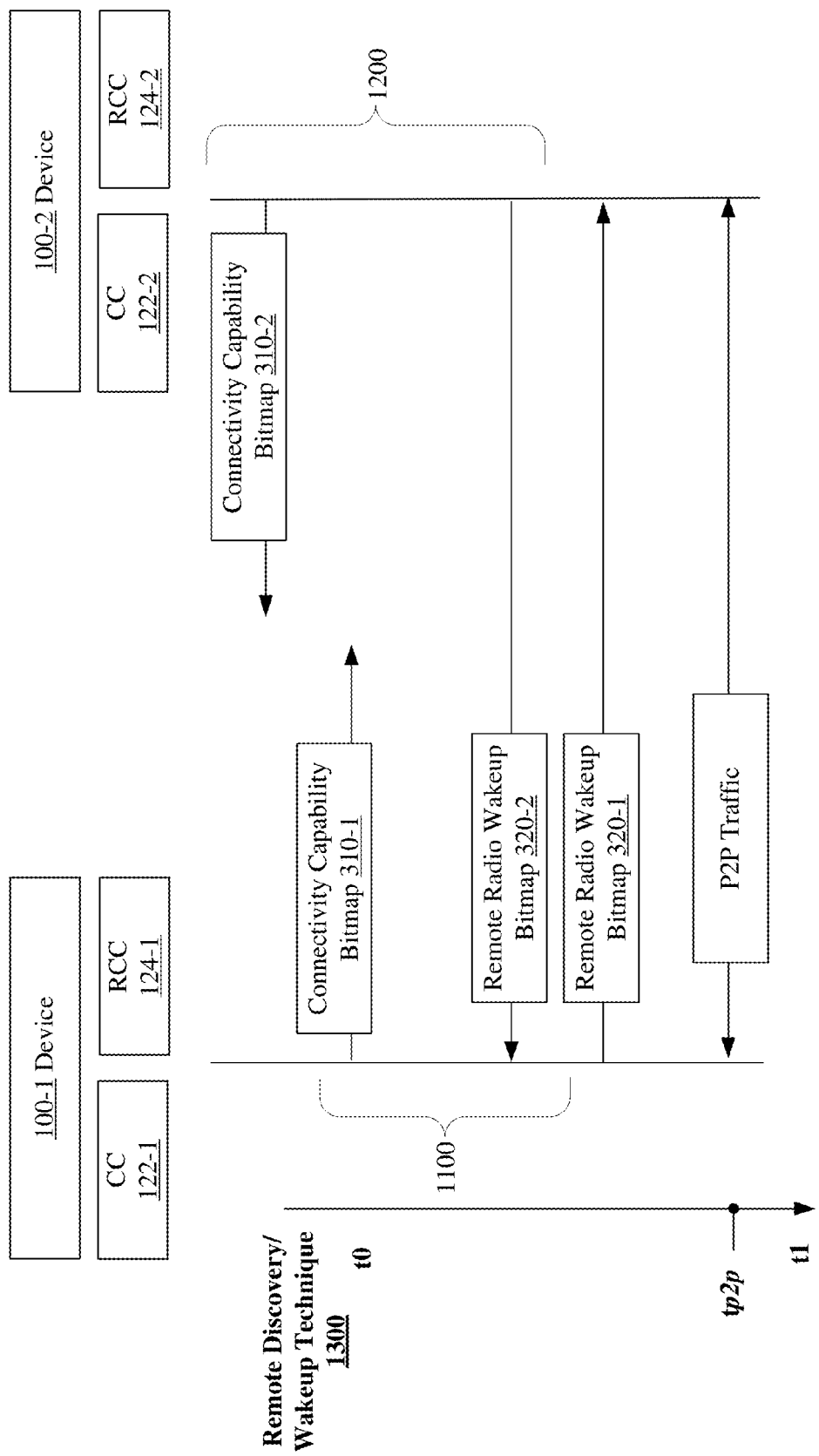
FIG. 6 illustrates one embodiment of a remote discovery and wakeup technique.

FIG. 6 illustrates an example remote device discovery and wakeup technique 1300. In some examples, the devices 100-a can implement the technique 1300. In particular, the acts depicted in the technique 1100 may be representative of a technique such as may be performed in various embodiments of the present disclosure. More particularly, the technique 1300 may be representative of a remote device discovery and radio wakeup procedure during which connectivity capability information and remote wakeup information are communicated using the second radios 114-a to facilitate establishing and/or communicating in a P2P network in a power efficient manner.

In the technique 1300, communications are exchanged between the devices 100-1 and 100-2. In general, a device (e.g., the device 100-1) may advertise supported connectivity capabilities by communicating connectivity capability information and establish a P2P connection based on receiving remote wakeup information. Additionally, a device (e.g., the device 100-2) may identify a connectivity capability (e.g., based on a preferred connectivity capability, based on receiving connectivity capability information, or the like) and communicate remote wakeup information to establish a P2P connection using the connectivity capability.

In particular, the technique 1300 shows the device 100-1 communicating connectivity capability information 310-1 using the second radio 114-2 to advertise the connectivity capability supported by first radio 112-1. Additionally, the technique 1300 shows the device 100-1 receiving and/or communicating remote wakeup information connectivity capability bit 320-2 and/or 320-1 to establish the P2P network 1000. In some examples, the P2P network 1000 may be established using the first radio 112-1 based on receiving remote wakeup information 320-2. In some examples, the device 100-1 may be configured to communicate remote wakeup information 320-1 to acknowledge receipt of the remote wakeup information 320-1 and to confirm the P2P network 1000 will be established. As depicted, the device 100-1 may be configured to perform operations and/or functions corresponding to the method 1100 described above.

Furthermore, as noted above, the connectivity capability information 310 may include indications of an availability of the first radio 112-$a$. In particular, the connectivity capability information 310 may specify that the first radio 112-$a$ may be available at time $t_{P2P}$ as shows in FIG. 6. More specifically, the connectivity capability information 310 may include an indication that a discovery windows for the radio 112-1 may be open at time $t_{P2P}$ and/or that the P2P network 1000 may be established at time $t_{P2P}$.

The technique 1300 shows the device 100-2 communicating connectivity capability information 310-2 and the remote wakeup information 320-2 to request establishment of the P2P network 1000. In some examples, the device 100-2 may be configured to communicate the remote wakeup information 320-2 based on receiving the connectivity capability information 310-1. More specifically, the deice 100-2 may be configured to perform operations and/or functions corresponding to the method 1200 described above.

Figure 7:
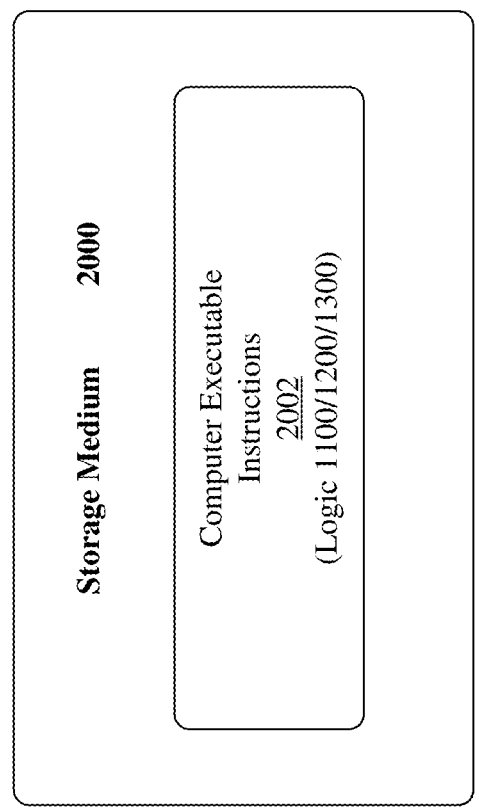
FIG. 7 illustrates one embodiment of a storage medium.

FIG. 7 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200. In some examples, the storage medium 2000 may store various types of computer executable instructions to implement logic flow 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
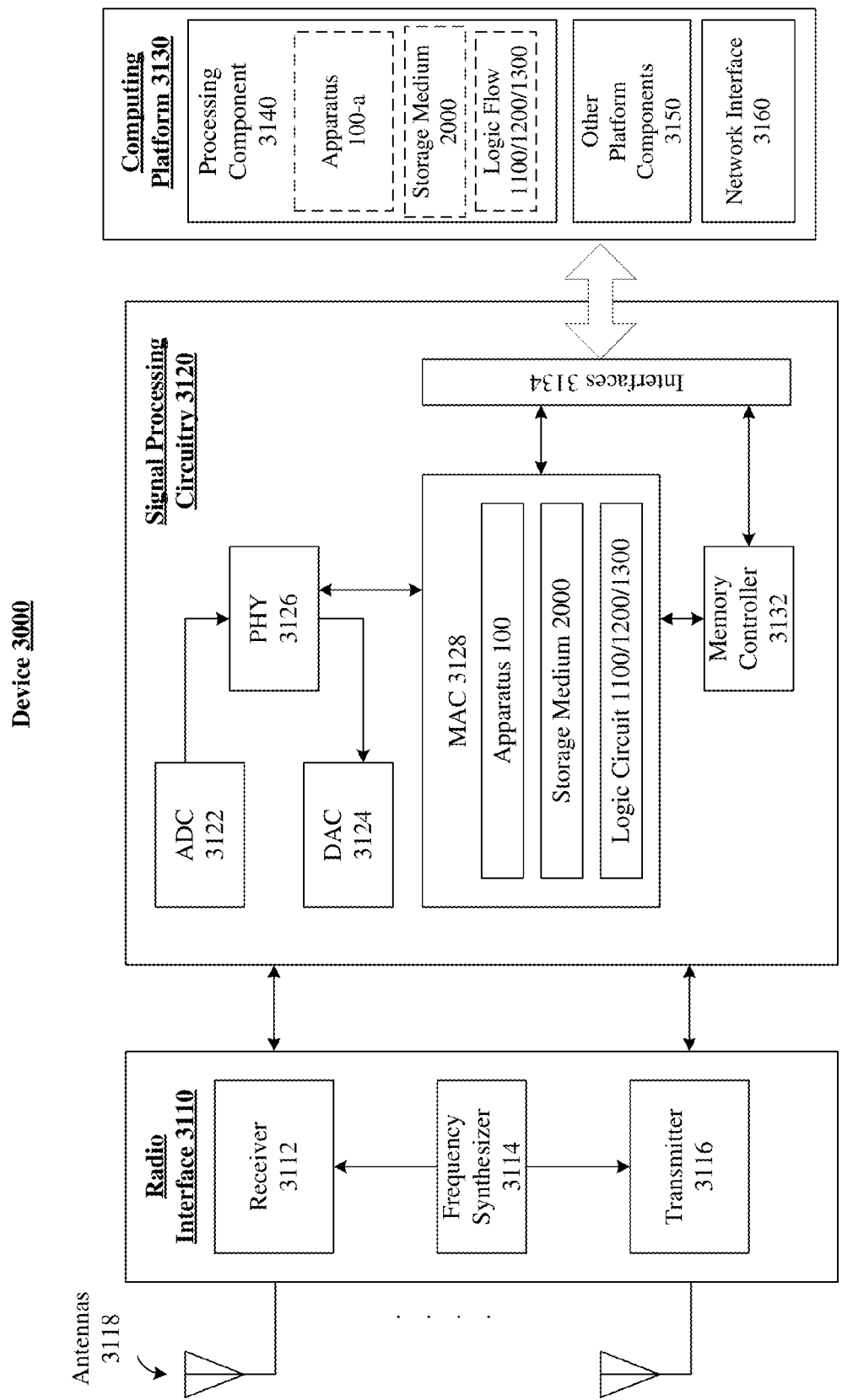
FIG. 8 illustrates one embodiment of a device.

FIG. 8 illustrates an embodiment of a device 3000. In some examples, device 3000 may be configured or arranged for wireless communications in a P2P network such that the P2P network 1000 shown in FIG. 1. In some examples, one of the devices 100-$a$ may be implemented in the device 3000. For example, the device 3000 may implement the device as apparatus 100-$a$. Additionally, the device 3000 may implement storage medium 2000 and/or a logic circuit 1100/1200/1300. The logic circuits may include physical circuits to perform operations described for the apparatus 100-$a$, storage medium 2000, logic flow 1100, logic flow 1200, and/or logic flow 1300. As shown in FIG. 8, device 3000 may include a radio interface 3110, baseband circuitry 3120, and computing platform 3130, although examples are not limited to this configuration.

The device 3000 may implement some or all of the structure and/or operations for the apparatus 100-$a$, the storage medium 2000 and/or the logic circuit 1100/1200/1300 in a single computing entity, such as entirely within a single device. The embodiments are not limited in this context.

Radio interface 3110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 3110 may include, for example, a receiver 3112, a transmitter 3116 and/or a frequency synthesizer 3114. Radio interface 3110 may include bias controls, a crystal oscillator and antennas 3118-1 to 3118-f. In another embodiment, radio interface 3110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 3120 may communicate with radio interface 3110 to process receive and/or transmit signals and may include, for example, an analog-to-digital converter 3122 for down converting received signals, a digital-to-analog converter 3124 for up converting signals for transmission. Further, baseband circuitry 3120 may include a baseband or physical layer (PHY) processing circuit 3126 for PHY link layer processing of respective receive/transmit signals. Baseband circuitry 3120 may include, for example, a processing circuit 3128 for medium access control (MAC)/data link layer processing. Baseband circuitry 3120 may include a memory controller 3132 for communicating with MAC processing circuit 3128 and/or a computing platform 3130, for example, via one or more interfaces 3134.

In some embodiments, PHY processing circuit 3126 may include a frame construction and/or detection module, in combination with additional circuitry such as a buffer memory, to construct and/or deconstruct communication frames (e.g., containing subframes). Alternatively or in addition, MAC processing circuit 3128 may share processing for certain of these functions or perform these processes independent of PHY processing circuit 3126. In some embodiments, MAC and PHY processing may be integrated into a single circuit.

Computing platform 3130 may provide computing functionality for device 3000. As shown, computing platform 3130 may include a processing component 3140. In addition to, or alternatively of, baseband circuitry 3120 of device 3000 may execute processing operations or logic for the apparatus 100a, storage medium 2000, and logic circuits 1100/1200/1300 using the processing component 3130. Processing component 3140 (and/or PHY 3126 and/or MAC 3128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 3130 may further include other platform components 3150. Other platform components 3150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 3130 may further include a network interface 3160. In some examples, network interface 3160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 3000 may be part of a device in a P2P network and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 3000 may be implemented using any combination of discrete circuitry, application specific integrated circuits (ASICs), logic gates and/or single chip architectures. Further, the features of device 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 3000 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
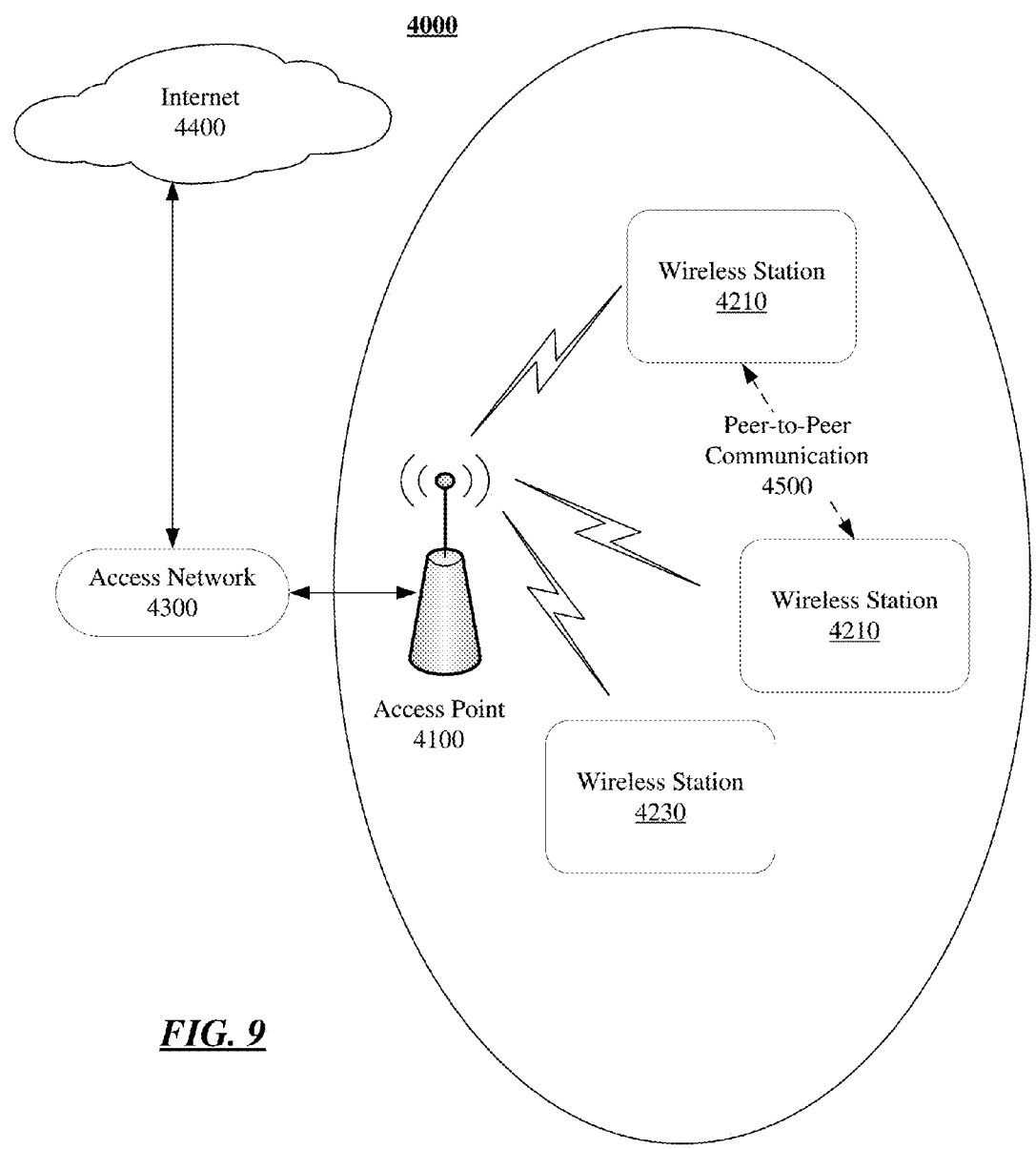
FIG. 9 illustrates one embodiment of a wireless network.

FIG. 9 illustrates an embodiment of a wireless network 4000. As shown in FIG. 7, wireless network 4000 comprises an access point 4100 and wireless stations 4210, 4220, and 4230. In various embodiments, wireless network 4000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 4000 may comprise another type of wireless network, and/or may implement other wireless communications standards. In various embodiments, for example, wireless network 4000 may comprise a WWAN or WPAN rather than a WLAN. The embodiments are not limited to this example.

In some embodiments, wireless network 4000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 4210, 4220, and 4230 may communicate with access point 4100 in order to obtain connectivity to one or more external data networks. In some embodiments, for example, wireless stations 4210, 4220, and 4230 may connect to the Internet 4400 via access point 4100 and access network 4300. In various embodiments, access network 4300 may comprise a private network that provides subscription-based Internet-connectivity, such as an Internet Service Provider (ISP) network. The embodiments are not limited to this example.

In various embodiments, two or more of wireless stations 4210, 4220, and 4230 may communicate with each other directly by exchanging peer-to-peer communications. For example, as depicted in FIG. 9, wireless stations 4210 and 4220 communicate with each other directly by exchanging peer-to-peer communications 4500. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. In various embodiments, such peer-to-peer communications may be performed according to the MFA NAN protocol. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose might be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

EXAMPLE 1

An apparatus for a device in a wireless network, the apparatus including circuitry, a connectivity component executable by the circuitry, the connectivity component to determine a connectivity capability utilizing a first radio and to generate connectivity capability information for communication using a second radio, the connectivity capability information including an indication of the connectivity capability.

EXAMPLE 2

The apparatus of example 1, the first radio operably coupled to the circuitry; and the second radio operably coupled to the circuitry, the second radio to utilize a lower amount of power relative to the first radio.

EXAMPLE 3

The apparatus of example 1, the second radio operably coupled to the circuitry, the connectivity component to send a control directive to power on the second radio in order to communicate the connectivity capability information.

EXAMPLE 4

The apparatus of example 3, further comprising a remote connection component executable by the circuitry, the remote connection component to receive a remote wakeup information, the remote wakeup information including an indication of a request to establish a connection using the connectivity capability.

EXAMPLE 5

The apparatus of example 4, the remote connection component to send a control directive to power on the first radio in order to establish communication using the connectivity capability.

EXAMPLE 6

The apparatus of example 1, the connectivity component to determine an availability of the first radio and to generate the connectivity capability information to include an indication of the availability.

EXAMPLE 7

The apparatus of example 1, the connectivity capability to comprise one or more of Wi-Fi peer-to-peer (P2P), Wi-Fi Direct, TDLS, IBSS, Mesh, Ranging/Location, WiGig, and Wi-Fi NAN.

EXAMPLE 8

The apparatus of example 1, the first radio to comprise a Wi-Fi radio.

EXAMPLE 9

The apparatus of example 1, the connectivity capability to utilize either the first radio or a third radio, the third radio being different than the first radio.

EXAMPLE 10

The apparatus of example 9, the first radio to comprise a Wi-Fi radio and the third radio to comprise either a WiGig radio or a ZigBee radio.

EXAMPLE 11

The apparatus of any one of examples 1 to 10, the second radio to comprise a Bluetooth radio.

EXAMPLE 12

The apparatus of any one of examples 1 to 10, further including a first antenna array operably coupled to the first radio, and a second antenna array operably coupled to the second radio.

EXAMPLE 13

The apparatus of any one of examples 1 to 10, further including a first antenna array operably coupled to the first radio and the second radio.

EXAMPLE 14

The apparatus of any one of examples 1 to 10, the circuitry to comprise an application processor.

EXAMPLE 15

The apparatus of any one of examples 1 to 10, the circuitry to comprise a baseband processor.

EXAMPLE 16

An apparatus for a device in a wireless network, the apparatus including circuitry, and a connectivity component executable by the circuitry, the connectivity component to determine a connectivity capability utilizing a first radio, and a remote connection component executable by the circuitry, the remote connection component to generate remote wakeup information for communication using a second radio, the remote wakeup information including an indication of a request to establish a connection using the connectivity capability.

EXAMPLE 17

The apparatus of example 16, the first radio operably coupled to the circuitry; and the second radio operably coupled to the circuitry, the second radio to utilize a lower amount of power relative to the first radio.

EXAMPLE 18

The apparatus of example 16, the second radio operably coupled to the circuitry, the remote connection component to send a control directive to power on the second radio in order to communicate the remote wakeup information.

EXAMPLE 19

The apparatus of example 16, the connectivity component to receive a connectivity capability information, the connectivity capability information including an indication of a supported connectivity capability for an adjacent device, the connectivity component to determine the connectivity capability based on the supported connectivity capability.

EXAMPLE 20

The apparatus of example 19, the remote connection component to communicate the remote wakeup information to the adjacent device.

EXAMPLE 21

The apparatus of example 16, the connectivity component to generate a connectivity capability information for communication using the second radio, the connectivity capability information including an indication of the connectivity capability.

EXAMPLE 22

The apparatus of example 21, the connectivity capability information to comprise the remote wakeup information.

EXAMPLE 23

The apparatus of example 21, the connectivity component to determine an availability of the first radio and to generate the connectivity capability information to include an indication of the availability.

EXAMPLE 24

The apparatus of example 16, the remote connection component to send a control directive to power on the first radio in order to establish communication using the connectivity capability.

EXAMPLE 25

The apparatus of example 16, the connectivity capability to comprise one or more of Wi-Fi peer-to-peer (P2P), Wi-Fi Direct, TDLS, IBSS, Mesh, Ranging/Location, WiGig, and Wi-Fi NAN.

EXAMPLE 26

The apparatus of example 16, the first radio to comprise a Wi-Fi radio.

EXAMPLE 27

The apparatus of example 16, the connectivity capability to utilize either the first radio or a third radio, the third radio being different than the first radio.

EXAMPLE 28

The apparatus of example 27, the first radio to comprise a Wi-Fi radio and the third radio to comprise either a WiGig radio or a ZigBee radio.

EXAMPLE 29

The apparatus of any one of examples 16 to 28, the second radio to comprise a Bluetooth radio.

EXAMPLE 30

The apparatus of any one of examples 16 to 28, further including a first antenna array operably coupled to the first radio, and a second antenna array operably coupled to the second radio.

EXAMPLE 31

The apparatus of any one of examples 16 to 28, further including a first antenna array operably coupled to the first radio and the second radio.

EXAMPLE 32

The apparatus of any one of examples 16 to 28, the circuitry to comprise an application processor.

EXAMPLE 33

The apparatus of any one of examples 16 to 28, the circuitry to comprise a baseband processor.

EXAMPLE 34

A method implemented by a device in a wireless network, the method including determining a connectivity capability utilizing a first radio, and generating connectivity capability information for communication using a second radio, the connectivity capability information including an indication of the connectivity capability.

EXAMPLE 35

The method of examples 34, the second radio to utilize a lower amount of power relative to the first radio.

EXAMPLE 36

The method of example 34, further comprising sending a control directive to power on the second radio in order to communicate the connectivity capability information.

EXAMPLE 37

The method of example 36, further comprising receiving a remote wakeup information, the remote wakeup information including an indication of a request to establish a connection using the connectivity capability.

EXAMPLE 38

The method of example 37, further comprising sending a control directive to power on the first radio in order to establish communication using the connectivity capability.

EXAMPLE 39

The method of example 34, further including determining an availability of the first radio, and generating the connectivity capability information to include an indication of the availability.

EXAMPLE 40

The method of example 34, the connectivity capability to comprise one or more of Wi-Fi peer-to-peer (P2P), Wi-Fi Direct, TDLS, IBSS, Mesh, Ranging/Location, WiGig, and Wi-Fi NAN.

EXAMPLE 41

The method of example 34, the first radio to comprise a Wi-Fi radio.

EXAMPLE 42

The method of example 34, the connectivity capability to utilize either the first radio or a third radio, the third radio being different than the first radio.

EXAMPLE 43

The method of example 42, the first radio to comprise a Wi-Fi radio and the third radio to comprise either a WiGig radio or a ZigBee radio.

EXAMPLE 44

The method of any one of examples 34 to 43, the second radio to comprise a Bluetooth radio.

EXAMPLE 45

A method implemented by a device in a wireless network, the method including determining a connectivity capability utilizing a first radio, and generating remote wakeup information for communication using a second radio, the remote wakeup information including an indication of a request to establish a connection using the connectivity capability.

EXAMPLE 46

The method of example 45, the second radio to utilize a lower amount of power relative to the first radio.

EXAMPLE 47

The method of example 45, further comprising sending a control directive to power on the second radio in order to communicate the remote wakeup information.

EXAMPLE 48

The method of example 45, further comprising receiving a connectivity capability information, the connectivity capability information including an indication of a supported connectivity capability for an adjacent device, wherein the connectivity capability is determined based on the supported connectivity capability.

EXAMPLE 49

The method of example 48, further comprising communicating the remote wakeup information to the adjacent device.

EXAMPLE 50

The method of example 45, further comprising generating a connectivity capability information for communication using the second radio, the connectivity capability information including an indication of the connectivity capability.

EXAMPLE 51

The method of example 50, the connectivity capability information to comprise the remote wakeup information.

EXAMPLE 52

The method of example 45, further including determining an availability of the first radio, and generating the connectivity capability information to include an indication of the availability.

EXAMPLE 53

The method of example 45, further comprising sending a control directive to power on the first radio in order to establish communication using the connectivity capability.

EXAMPLE 54

The method of example 45, the connectivity capability to comprise one or more of Wi-Fi peer-to-peer (P2P), Wi-Fi Direct, TDLS, IBSS, Mesh, Ranging/Location, WiGig, and Wi-Fi NAN.

EXAMPLE 55

The method of example 45, the first radio to comprise a Wi-Fi radio.

EXAMPLE 56

The method of example 45, the connectivity capability to utilize either the first radio or a third radio, the third radio being different than the first radio.

EXAMPLE 57

The method of example 45, the first radio to comprise a Wi-Fi radio and the third radio to comprise either a WiGig radio or a ZigBee radio.

EXAMPLE 58

The method of any one of examples 45 to 57, the second radio to comprise a Bluetooth radio.

EXAMPLE 59

An apparatus for a device in a wireless network, the apparatus comprising means to perform the method of any of examples 34 to 58.

EXAMPLE 60

At least one machine readable medium comprising a plurality of instructions that in response to being executed on a transmitter node and/or a receiver node in a wireless network cause any one the transmitter node and/or receiver node to perform the method of any of examples 34 to 58.

EXAMPLE 61

An apparatus for a wireless network including a processor, a radio operably connected to the processor, one or more antennas operably connected to the radio to transmit or receive wireless signals, and a memory comprising a plurality of instructions that in response to being executed by the processor cause the processor or the radio to perform the method of any of examples 34 to 58.

The invention claimed is:

1. An apparatus for a device in a wireless network, the apparatus comprising:
   circuitry;
   logic, at least partially implemented in the circuitry, the logic to:
      determine a connectivity capability utilizing a first radio and to generate connectivity capability information for communication using a second radio, the connectivity capability information including one or more bits indicating the connectivity capability including one or more connectivity services supported by the device utilizing the first radio; and
      cause the second radio to communicate the connectivity capability information including the one or more bits of a connectivity capability bitmap, the one or more bits indicating the connectivity capability in a Bluetooth frame.

2. The apparatus of claim 1, the first radio operably coupled to the circuitry; and the second radio operably coupled to the circuitry, the second radio to utilize a lower amount of power relative to the first radio.

3. The apparatus of claim 1, the second radio operably coupled to the circuitry, the logic to send a control directive to power on the second radio in order to communicate the connectivity capability information.

4. The apparatus of claim 3, the logic to receive remote wakeup information, the remote wakeup information including an indication of a request to establish a connection using the connectivity capability.

5. The apparatus of claim 4, the logic to send a control directive to power on the first radio in order to establish communication using the connectivity capability.

6. The apparatus of claim 1, the logic to determine an availability of the first radio and to generate the connectivity capability information to include an indication of the availability.

7. The apparatus of claim 1, the connectivity capability to comprise one or more of Wi-Fi P2P, Wi-Fi Direct, TDLS, IBSS, Mesh, Ranging/Location, WiGig, and Wi-Fi NAN.

8. The apparatus of claim 1, the first radio to comprise a Wi-Fi radio and the second radio to comprise a Bluetooth radio.

9. The apparatus of claim 1, further comprising:
   a first antenna array operably coupled to the first radio; and
   a second antenna array operably coupled to the second radio.

10. The apparatus of claim 1, further comprising:
    a first antenna array operably coupled to the first radio and the second radio.

11. The apparatus of claim 1, the circuitry to comprise an application processor or a baseband processor.

12. A method implemented by a device in a wireless network, the method comprising:
    determining a connectivity capability utilizing a first radio;
    generating connectivity capability information for communication using a second radio, the connectivity capability information including one or more bits indicating the connectivity capability including one or more connectivity services supported by the device utilizing the first radio, the second radio to utilize a lower amount of power relative to the first radio; and causing the second radio to communicate the connectivity capability information including the one or more bits of a connectivity capability bitmap, the one or more bits indicating the connectivity capability in a Bluetooth frame.

13. The method of claim 12, further comprising receiving remote wakeup information, the remote wakeup information including an indication of a request to establish a connection using the connectivity capability.

14. The method of claim 13, further comprising:
determining an availability of the first radio; and
generating the connectivity capability information to include an indication of the availability.

* * * * *